Figure 5:
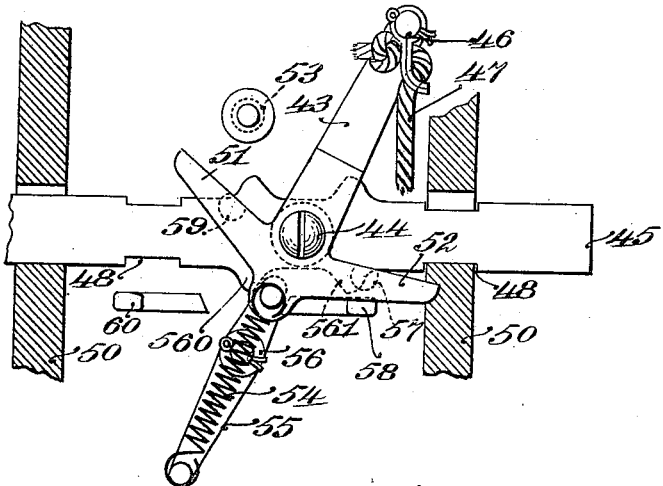

I. W. LITCHFIELD.
BELT SHIFTER.
APPLICATION FILED JULY 26, 1907.
961,417.
Patented June 14, 1910.
2 SHEETS—SHEET 1.
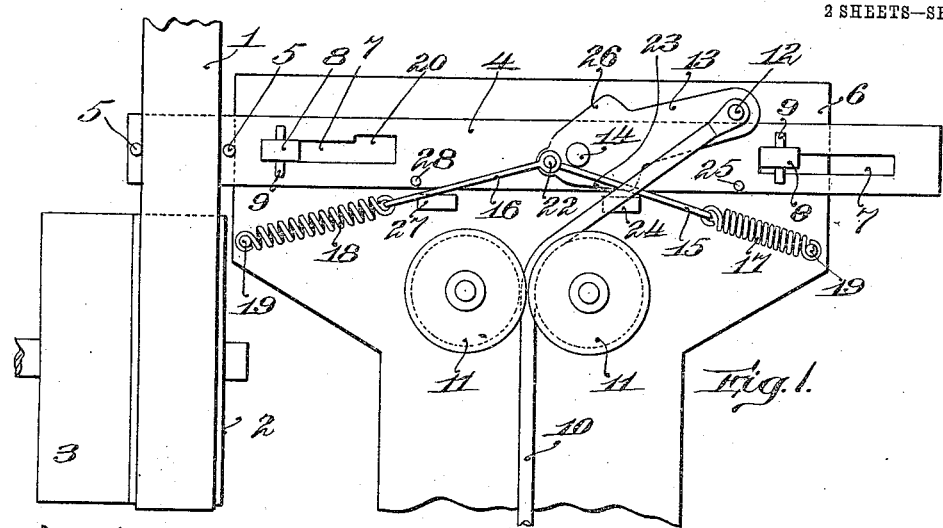
Fig. 1.
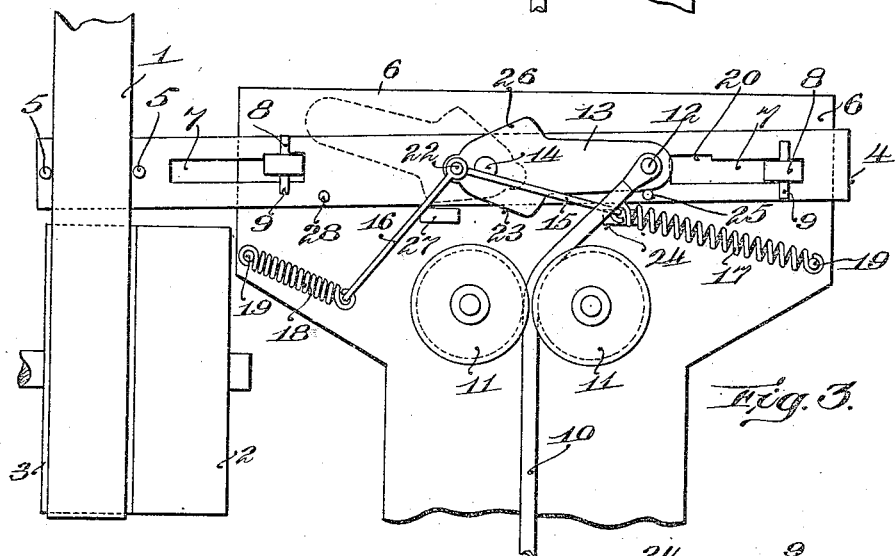
Fig. 3.
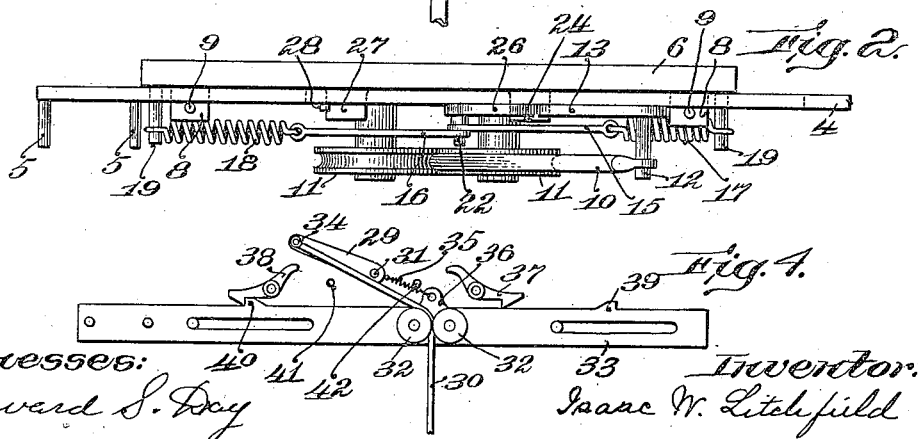
Fig. 2.
Fig. 4.
Witnesses:
Edward S. Day
A. C. Richardson,
Inventor:
Isaac W. Litchfield
by
Phillips Van Everen & Fish
Attys.

I. W. LITCHFIELD.
BELT SHIFTER.
APPLICATION FILED JULY 26, 1907.

961,417.

Patented June 14, 1910.
2 SHEETS—SHEET 2.

Witnesses
Edward S. Day
A. C. Richardson

Inventor
Isaac W. Litchfield
by
Phillips Van Everen & Fish
Attys.

UNITED STATES PATENT OFFICE.

ISAAC W. LITCHFIELD, OF BOSTON, MASSACHUSETTS, ASSIGNOR OF ONE-HALF TO HARRY H. DE LOSS, OF BRIDGEPORT, CONNECTICUT.

BELT-SHIFTER.

961,417.

Specification of Letters Patent. Patented June 14, 1910.

Application filed July 26, 1907. Serial No. 385,616.

*To all whom it may concern:*

Be it known that I, ISAAC W. LITCHFIELD, a citizen of the United States, residing at Boston, in the county of Suffolk and State of Massachusetts, have invented certain new and useful Improvements in Belt-Shifters; and I do hereby declare the following to be a full, clear, and exact description of the invention, such as will enable others skilled in the art to which it appertains to make and use the same.

The invention relates to mechanism for shifting belts or other devices which it is desired to shift alternately between two positions, and more especially to that class of devices in which the shifter is moved in opposite directions by successive applications of force to the actuator cord, chain or rod through which motion is transmitted to the shifter operating mechanism by the operator.

The object of the invention is to simplify and improve the devices through which the force applied to the actuator cord, chain or bar is transmitted to the shifter in reverse directions during successive operations of the actuator. In accordance with one of the principal features of the invention, these devices comprise an oscillating member to which the actuator is connected, and means for shifting said member between successive movements of the shifter to carry the point of connection between the oscillating member and the actuator member from one side to the other of the axis of the oscillating member. In accordance with this feature of the invention the shifter may be actuated or moved by the movement of either the oscillating member or the actuating member, or by a combined movement of both, the oscillating member being shifted after each application of force to the actuator in such manner that at the next application of force to the actuator the shifter will be moved in a direction opposite to that in which it was moved during the preceding application of force to the actuator. In accordance with the further feature of the invention, the oscillating member to which the actuator is connected is mounted upon the shifter and the movement imparted to the oscillating member by the movement of the actuator is transmitted through the oscillating member to the shifter. In practicing these features of the invention it is also preferred to shift the oscillating member when the actuator is released by means of spring connections which are tensioned by the movement of the shifter when the actuator is operated.

The feature of the invention above referred to, as well as further features which will be referred to in the claims, will be readily understood from an inspection of the drawings, in which several forms of apparatus embodying some or all of said features are shown.

Figure 6:
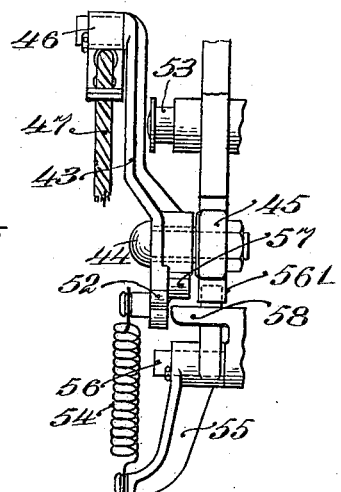
Figure 7:
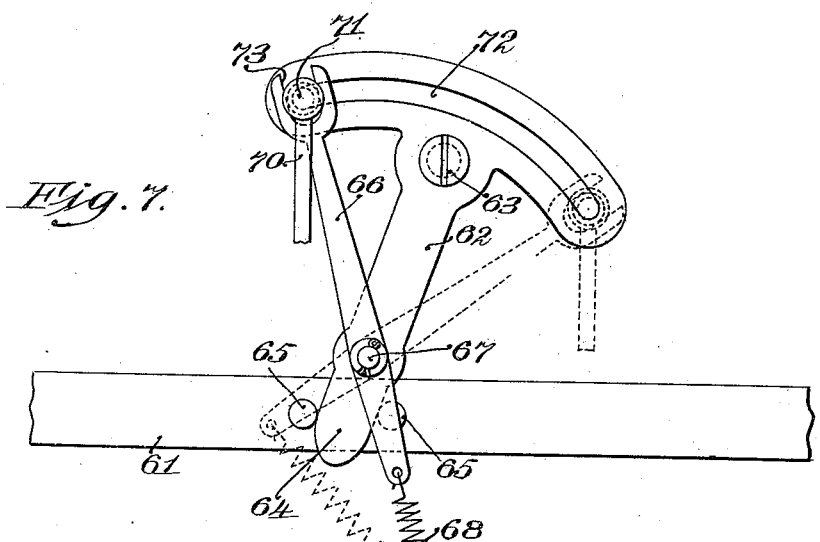

In these drawings Figure 1 is a front elevation of an apparatus embodying various features of the invention; Fig. 2 is a plan view of the same; Fig. 3 is a view similar to Fig. 1 showing the parts in another position; Fig. 4 is a front elevation of a modified form of the apparatus; Fig. 5 is a front elevation of another form of apparatus embodying all the features of the invention in the form in which it is preferred to employ them; Fig. 6 is an end elevation of the same; and Fig. 7 is a front elevation of another form of apparatus embodying certain features of the invention.

In the construction shown in Figs. 1, 2 and 3, an apparatus is shown especially designed for shifting a belt from one pulley to another. In these views the belt is indicated at 1, and the pulleys between which the belt is shifted are indicated at 2 and 3. The device for shifting the belt from one pulley to another consists of a shifter bar 4 provided with pins 5 for engaging opposite sides of the belt. This bar is mounted upon a rear-plate 6 and is provided with slots 7 which ride over lugs 8 projecting from the front face of the plate 6. The shifter bar is retained upon the lugs by means of pins 9. The actuator through which motion is imparted to the shifter bar 4 consists in this construction of a cord 10 which passes down between grooved pulleys 11 mounted on the plate 6, and has its lower end arranged where it may be conveniently seized and pulled by the operator. The upper end of the actuator cord 10 is connected at 12 to an oscillating lever 13 which is pivoted at 14 upon the shifter bar 4. The lower end of this lever is connected by means of links 15 and 16 with springs 17 and 18, which are in turn connected with pins 19 upon the plate 6. The bar 4 is held in position at either end of its throw by locking recesses 20 formed at the inner ends of the slots 7 and adapted to engage the lugs 8.

Assuming that the parts are in the position indicated in Fig. 1, the bar 4 will be locked in position by the engagement of the recess 20 at the end of the right-hand slot 7 with the right-hand lug 8, and the belt 1 will be held in position to run over the pulley 2. With the parts in this position, the spring 18 will be under tension, and will hold the oscillating lever 13 in the position indicated, the point of attachment 22 for the link 16 being held in line between the fixed pin 19 and the pivot 14 for the oscillating lever. When the belt is to be shifted from the pulley 2 to the pulley 3, the operator pulls the actuator cord 10. This pull upon the cord swings the lever 13 downward about its pivot, and during the initial movement of the lever the laterally projecting side 23 of the lever engages a lug 24 which projects from the face of the plate 6, and thereafter the continued swinging movement of the lever causes the pivot 14 to rise, thus lifting the bar 4 so that the locking recess 20 is disengaged from the lug 8. After the shifter bar has thus been unlocked, the continued movement of the lever 13 brings it into engagement with a pin 25 projecting from the front face of the shifter bar 4, so that the swinging movement of the lever is arrested. Now the pull upon the cord 10 is transmitted through the lever 13 to the bar 4 and shifts the bar into the position indicated in full lines in Fig. 3, thus shifting the belt from the pulley 2 on to the pulley 3. During this movement of the shifter bar 4 the tension on the spring 18 is relieved and the spring 17 is put under tension, so that when the actuator cord 10 is released the spring 17 shifts the lever 13 from the position indicated in full lines in Fig. 3 to the position indicated in dotted lines in said figure. This movement of the lever carries the point 12 to which the cord 10 is connected from the right-hand side of the pivot 14 of the lever to the left-hand side of said pivot, and the cord will pass over the left-hand pulley 11. The locking recess 20 at the end of the left-hand slot 7 will now engage the left-hand lug 8 and lock the shifter bar in position to maintain the belt upon the pulley 3. When the belt is to be again shifted from the pulley 3 to the pulley 2, the operator pulls the cord 10. The pull upon the cord 10 now swings the lever 13 downward from the dotted line position, the projecting side 26 of the lever coöperating with the lug 27 to lift the bar 4 and disengage the locking recess from the lug 8, and the continued movement of the lever bringing the lever into engagement with a pin 28 on the bar 4, after which the pull upon the cord moves the shifter bar 4 toward the right and thus shifts the belt onto the pulley 2. This movement of the bar puts the spring 18 under tension, so that when the actuator cord 10 is released, the spring 18 acts to shift the oscillating lever 13 into the position indicated in Fig. 1, thus carrying the point of connection 12 between the actuator cord and lever from the left side of the pivot 14 to the right side. Thus between successive pulls upon the actuator cord 10 the oscillating lever 13 is shifted to carry the point of connection between the lever and the cord from one side of the axis of the lever to the other, so that the direction in which the force applied to the actuator cord is transmitted to the shifter is reversed between successive movements of the shifter.

In the construction shown in Fig. 4 the relation of certain parts is reversed. In this construction the oscillating lever 29 to which the actuator cord 30 is connected is mounted upon a fixed pivot 31, and the pulleys 32 over which the actuator cord passes are mounted upon the shifter bar 33. In this construction the actuator cord 30 is connected at 34 with the upper end of the oscillating lever 29, and the lower end of the lever is connected by a spring 35 with a lug 36 on the shifter bar. The shifter bar is locked at either side of its throw by means of pivoted locking latches 37 and 38 arranged to engage lugs 39 and 40 respectively on the bar 33.

Assuming the parts to be in the position indicated in Fig. 4, the shifter bar will be locked in its right-hand position by the engagement of the locking latch 38 with the lug 40, and the actuator cord will pass over the left-hand pulley 32 as indicated. When a pull is exercised on the actuator cord the oscillating lever will be swung downward until it engages a stop 41, when its downward movement will be arrested. During this initial movement of the lever it will strike the upper arm of the locking latch 38 and disengage the latch from the lug 40, so that the bar 33 will be free to move toward the left. After the lever 29 engages the stop-pin 41 a continued pull upon the actuator cord 30 will cause the pulleys 32 and the bar 33 to be moved toward the left. During this movement of the shifter bar 33 the tension on the spring 35 will be relieved, and thus as the lug 36 passes to the left of the pivot 31 of the oscillating lever the spring will be again put under tension. This movement of the actuator bar 33 will bring the lug 39 to the left of the locking latch 37, so that the latch will engage the lug and lock the bar in its left-hand position. When the actuator cord is released the tension on the spring 35 will act to shift the oscillating lever 29 toward the right, thus carrying the point of connection 34 between the actuator cord and lever from the left-hand side of the pivot 31 to the right-hand side. When the cord 30 is again pulled, the lever 29 will swing downward until it engages the stop-pin 42, during which movement it will operate the latch 37 so that the bar 33 will be released and will be free to move toward the right under the continued pull exerted upon the actuator cord. Thus in this construction the oscillating member 29 is shifted between successive movements of the shifter bar to carry the point of connection between the actuating member and said oscillating member from one side to the other of the axis of the oscillating member, and thus reverse the direction in which the force applied to the actuator is transmitted to the shifter.

In the construction shown in Fig. 5, the oscillating member which is shifted to reverse the direction in which the force applied to the actuator is transmitted to the shifter, consists of a lever 43 pivoted at 44 to the shifter bar 45, and connected at 46 with an actuator cord or rod 47. In this construction the devices for locking the shifter bar in position at either end of its throw consist of locking recesses 48 formed in the bar and adapted to engage the supports 50 in which the bar is mounted. The lever 43 is provided with two oppositely projecting arms 51 and 52 arranged to alternately engage opposite sides of a fixed abutment pin or roller 53. The lower end of the lever 43 is connected by means of a spring 54 with the lower end of a lever 55 which is mounted on a fixed pivot 56. The upper end of the lever 55 is arranged in the path of two lugs 560 and 561 on the bar 45.

Assuming the parts to be in the position indicated in Fig. 5, the shifter bar will be locked in its right-hand position by the engagement of the right-hand locking recess 48 with the corresponding support 50. With the parts in this position, the spring 54 will hold the oscillating lever 43 in the position indicated. When the bar 45 is to be shifted toward the left, the operator pulls the actuator 47, thus swinging the lever 43 downward and toward the right. During the initial movement of the lever, a projecting lug 57 on the lever engages a fixed lug 58, and then during the continued movement of the lever the pivot 44 of the lever is raised, thus disengaging the locking recess 48 from the corresponding support 50. After the shifter bar is thus unlocked, continued movement of the lever 43 brings the arm 51 into engagement with the abutment 53, and thereafter the swinging movement of the lever causes the pivot 44 and the bar 45 to move toward the left. During this movement of the bar and lever 43 the lug 561 strikes the end of lever 55 swinging the lower end of the lever to the right of the pivot 56 and putting the spring under tension. This movement of the bar also brings the locking recess 48 at the left into engagement with the corresponding support 50. Now when the actuator 47 is released, the spring 54 acts to swing the lever 43 about its pivot carrying the point of attachment between the actuator and lever from the right-hand to the left-hand side of the pivot 44. When the actuator is again pulled, the lever 43 will be swung downward and toward the left, and the lug 59 on the lever will coöperate with the lug 60 to lift the bar 45 and thus unlock the bar, after which the arm 52 will engage the abutment 53 and coöperate therewith to shift the bar toward the right and into the position indicated in the drawings, the bar being locked in this position by the recess 48 and corresponding support 50. During this movement the lug 560 will act to shift the lever 55 into the posititon of Fig. 5. Now when the actuator 47 is released, the spring 54, which has been put under tension by the movement of the bar 45 toward the right, will swing the lever 43 into the position shown. Thus in this construction the oscillating member 43 is shifted between successive movements of the shifter bar to reverse the direction in which the force applied to the actuator is transmitted to the shifter, and this shifting movement of the oscillating member is effected by spring connections which are tensioned by the movement of the shifter.

In the construction shown in Fig. 7, the bar which carries the belt engaging device is indicated at 61, and this bar is moved first in one direction and then in the other by means of a shifter lever 62 which is mounted upon a fixed pivot 63. The lever is provided with a downwardly projecting arm 64 which plays between two pins 65 projecting from the face of the bar 61. The oscillating member to which the actuator is connected consists of a lever 66 pivoted at 67 to the shifter lever 62, and having its lower end connected by means of a spring 68 with a fixed pin 69. The actuator consists of a rod 70 which is connected with the upper end of the oscillating lever 66 by means of a pin 71. The pin 71 passes through a slot 72 formed in the shifter lever 62 above its pivot 63 and arranged concentrically with the axis of the oscillating lever 66. The pin 71 is mounted to slide freely in the slot 72, and also engages a slot 73 in the end of the oscillating lever 66. The bar 61 may be frictionally held against longitudinal movement under the influence of the spring 68, which may be a comparatively light spring, or the bar may be locked by devices similar to those shown in connection with the other modifications. In the latter case the arm 64 may act against the pin 65 to depress the bar 61 and disengage the locking devices when force is applied to the actuator rod 70.

Assuming the parts to be in the position indicated in Fig. 7, the bar 61 will be at the left-hand end of its throw, the shifter lever 62 being at the right-hand end of its throw. With the parts in this position the spring 68 will hold the oscillating lever 66 in the position indicated, with the point of connection between the actuator 70 and the lever at the left of the pivot 67 of the oscillating lever. The pin 71 in this position is also at the left of the pivot 63 of the actuator lever 62. When the bar 61 is to be shifted toward the right, the operator pulls the actuator 70. This pull is transmitted to the shifter lever 62 through the pin 71 which engages the left-hand end of the slot 72, so that the shifter lever 62 is swung about its pivot 63, the left-hand end of the arm in which the slot 72 is formed swinging downward at the left of the pivot 63, and the arm 64 swinging toward the right, and thus shifting the bar 61 in the same direction. This movement of the shifter lever 62 carries the pivot 67 of the oscillating lever 66 to the right of the fixed point 69 to which the lower end of the spring 68 is attached, and puts this spring under tension. When the actuator is released the spring 68 acts to swing the oscillating lever 66 about its pivot, carrying the pin 71 to the right-hand end of the slot 72, and thus shifting the point of attachment between the oscillating lever and actuator and also between the actuator and the shifter lever 62 from the left-hand side of the pivots of these two levers to the right-hand side of said pivots. When the actuator is again pulled a similar series of movements is effected in the reverse directions. Thus in this construction as in the other constructions the oscillating lever 66 acts between successive operations of the shifter to reverse the direction in which the force applied to the actuator is transmitted to the shifter.

Having explained the nature and object of the invention, and several forms of apparatus in which the invention may be embodied, what is claimed is:—

1. A shifting device, having in combination an oscillating member, an actuator member attached thereto, a shifter actuated by the movement of one of said members when force is applied to the actuator member, and means for shifting the point of connection between the oscillating member and actuator member from one side to the other of the axis of the oscillating member between successive movements of the shifter, substantially as described.

2. A shifting device, having in combination a shifter, an oscillating member mounted thereon, an actuator member connected with the oscillating member, and means for shifting the oscillating member between successive movements of the shifter to reverse the direction in which the force applied to the actuator is transmitted to the shifter, substantially as described.

3. A shifting device, having in combination an oscillating member, an actuator member attached thereto, a shifter actuated by the movement of one of said members when the force is applied to the actuator member, shifter locking devices released by the initial movement of the oscillating member, and means for changing the initial position of the oscillating member to reverse the direction in which the force applied to the actuator is transmitted to the shifter, substantially as described.

4. A shifting device, having in combination a shifter provided with locking recesses for locking the same at either end of its throw, coöperating lugs, an oscillating lever mounted on the shifter, an actuator member connected therewith, and means coöperating with the lever to disengage a locking recess from the corresponding lug during the initial movement of the oscillating lever, and means for shifting the lever upon the release of the actuator to reverse the direction in which force applied to the actuator is transmitted to the shifter, substantially as described.

5. A shifting device, having in combination a shifter, an oscillating member mounted thereon, an actuator member connected with the oscillating member, and connections tensioned by the movement of the shifter for shifting the oscillating member when the actuator member is released to reverse the direction in which force applied to the actuator member is transmitted to the shifter, substantially as described.

6. A shifting device, having in combination a shifter, an oscillating lever mounted thereon provided with laterally projecting arms, an abutment arranged to be alternately engaged by said arms, an actuator connected to the lever, and means for shifting the point of connection between the actuator and lever from one side to the other of the axis of the oscillating lever upon the release of the actuator, substantially as described.

7. A shifting device, having in combination a shifter, an oscillating lever mounted thereon provided with laterally projecting arms, locking devices for said shifter, lugs arranged to be engaged by the arms to unlock the shifter, an actuator connected to the lever, an abutment arranged to be alternately engaged by the arms on the lever, and spring connections for shifting the point of connection between the actuator and lever from one side to the other of the axis of the oscillating lever upon the release of the actuator, substantially as described.

8. A shifting device, having in combination a shifter, an oscillating lever mounted thereon provided with laterally projecting arms, an abutment arranged to be alternately engaged by said arms, an actuator connected with the lever, and means for shifting the point of connection between the actuator and lever from one side to the other of the axis of the oscillating lever upon the release of the actuator, comprising a lever, a spring connecting said lever and oscillating lever, and devices for shifting said lever by the movement of the shifter, substantially as described.

In testimony whereof I affix my signature, in presence of two witnesses.

ISAAC W. LITCHFIELD.

Witnesses:
    IRA L. FISH,
    ANNIE C. RICHARDSON.